US006067608A

United States Patent [19]
Perry

[11] Patent Number: 6,067,608
[45] Date of Patent: May 23, 2000

[54] HIGH PERFORMANCE MECHANISM FOR MANAGING ALLOCATION OF VIRTUAL MEMORY BUFFERS TO VIRTUAL PROCESSES ON A LEAST RECENTLY USED BASIS

[75] Inventor: Ron B. Perry, Wilton, N.H.

[73] Assignee: Bull HN Information Systems Inc., Billerica, Mass.

[21] Appl. No.: 09/049,869

[22] Filed: Mar. 27, 1998

Related U.S. Application Data

[63] Continuation of application No. PCT/US97/06226, Apr. 15, 1997
[60] Provisional application No. 60/015,501, Apr. 16, 1996.
[51] Int. Cl.[7] .............................. G06F 12/00; G06F 15/00
[52] U.S. Cl. ...................... 711/203; 711/111; 711/154; 711/159; 711/160; 345/509; 345/515
[58] Field of Search ................................... 711/100, 111, 711/133, 136, 154, 159, 160, 200, 203, 205; 345/507, 509, 512, 515, 516

[56] References Cited

U.S. PATENT DOCUMENTS

| | | | |
|---|---|---|---|
| 4,422,145 | 12/1983 | Sacco et al. | 711/154 |
| 5,579,473 | 11/1996 | Schlapp et al. | 345/501 |
| 5,808,617 | 9/1998 | Kenworthy et al. | 345/421 |
| 5,867,166 | 2/1999 | Myhrvold et al. | 345/419 |
| 5,990,912 | 11/1999 | Swanson | 345/516 |
| 6,008,820 | 12/1999 | Chauvin et al. | 345/502 |

*Primary Examiner*—Tuan V. Thai
*Attorney, Agent, or Firm*—Faith F. Driscoll; John S. Solakian

[57] ABSTRACT

The main storage of a system includes a virtual memory space containing a plurality of virtual frame buffers for storing information transferred from disk storage shared by a number of virtual processes being executed by the system. An associated buffer table and aging mechanism includes a buffer table storing a plurality of buffer table entries associated with the corresponding number of virtual buffers used for controlling access thereto and an age table containing entries associated with the buffer table entries containing forward and backward age pointers linked together defining the relative aging of the virtual frame buffers from the most recently used to least recently used. Each buffer table entry has a frequency reference counter which maintains a reference count defining the number of times that its associated virtual buffer has been uniquely accessed by the virtual processes. When a virtual frame buffer is required to made available as a replacement candidate, the system's input/output process scans the buffer table entries starting with the least recently used entry to locate an available buffer and examines reference counts contained in the buffer table entries and values derived from the age table indicating the depth or distance that such buffer table entries are from the least recently used position. When the frequency reference count and depth of a particular virtual buffer entry meets defined thresholds, the associated virtual buffer is used as the replacement candidate and its buffer entry is moved to a most recently used position by updating the age table forward and backward pointer entries.

30 Claims, 10 Drawing Sheets

Legend:
P0-P7 = Processor Attach Bits for 32 bit word Computer with Maximum Processor Complement of 8
NW = Needs Write
ML = Memory Locked
QW = Queued for Write
IB = I/O Busy (DMA in process by Tape, Printer, etc.)
TOP= Associated Frame Buffer Moved to MRU Position of Age Links

HIGH PERFORMANCE MECHANISM FOR MANAGING ALLOCATION OF VIRTUAL MEMORY BUFFERS TO VIRTUAL PROCESSES ON A LEAST RECENTLY USED BASIS

This is a continuation filed under 35 USC 365(c) and 120 of International Application No. PCT/US97/06226, with an International Filing Date of Apr. 15, 1997.

BACKGROUND OF THE INVENTION

1. Field of Use

The present invention relates to virtual memory management systems and, more particularly, to a method and an apparatus for replacing memory blocks or page frames within a virtual memory system on a least recently used (LRU) basis which minizes overhead.

2. Prior Art

A typical hierarchical structured memory system contains three levels of memory devices which differ from each other in terms of memory capacity, speed and cost. The first level contains a low capacity high-speed cache. The second level contains a slower primary or main memory while the third level contains a secondary large capacity memory storage device such as disks. When a process is to be run, its code and data are brought into primary or cache memory where the cache memory always holds the most recently used code or data. That is, the cache memory is used to store recently accessed blocks from secondary storage. The cache memory could also be part of primary memory or a separate memory between secondary and main memory.

In the above hierarchical memory structure, a memory management system is used to translate addresses and support dynamic memory allocation, support virtual memory and provide memory protection and security. It is the function of the virtual memory mechanism to allow programs to execute even when there are only a few blocks of a program residing in the primary memory while the rest of the program resides in secondary memory or disk storage.

Thus, traditional virtual memory management systems typically contain address translation mechanisms which map virtual or logical random access memory (RAM) addresses into physical RAM addresses. These mechanisms usually are included on microprocessor chips as memory management units (MMUs). Some of these mechanisms utilize associative caches organized as translation lookaside buffers (TLBs) to speed up system operations. In such designs, the TLB is used for storing information for translating a preestablished number (e.g. 16) most recently referenced pages. For each memory reference, a logical page address is compared with the address tags stored in the TLB. When a match is found, the corresponding physical page frame address is combined with an offset value from the logical address to form the physical address. When a match is not found, the processor references translation tables in main memory to automatically load the TLB. Typically, a least recently used (LRU) mechanism is used to determine which TLB entry will be replaced. For further information regarding these types of memory management architectures, reference may be made to the article entitled "A Survey of Microprocessor Architectures for Memory Management" by Borivoje Furht and Veljko Milutinovic, which appeared in the March 1987 issue of the publication, IEEE COMPUTER and to the article entitled "Microprocessor Memory Management Units" by Milan Milenkovic which appeared in the April, 1990 issue of the publication, IEEE MICRO.

When the capacity of the primary or main memory becomes exceedingly large (e.g. contain gigabytes of storage), the traditional virtual memory mechanisms are unable to adequately support virtual memory without incurring substantial overhead thereby significantly reducing overall system performance. This comes about because of the restrictions placed on limited number of entries which can reside in cache memory at any one time notwithstanding the establishment of specific thresholds used in conjunction with the cache memory's LRU mechanism for carrying out block or data entry replacement. The result is that performance slows down because the system spends much of its time swapping out useful data that it will need very shortly to bring in new data that it needs immediately. In certain situations, this can reach the thrash point where none of the processes make any progress because they keep trying to bring in the data they need and in so doing, they replace the data required by other processes.

When the number of blocks or entries are increased to accommodate increases in primary or main memory capacity, this approach has been deferred in favor of utilizing a clock like mechanism to generate reference bits which approximate the LRU mechanism. The use of thresholds and reference counts is discussed in U.S. Pat. No. 5,043,885 to John T. Robins on which issued on Aug. 27, 1991.

Thus, the above described virtual memory management systems are somewhat limited in terms of the size of the virtual address space. By contrast, a true virtual memory system is limited only by the number of address bits that the processor can generate and not by the size of available main memory on any given machine. Thus, any 32 bit system that supports virtual memory should allow program sizes of up to 4 gigabytes ($2^{32}$) of the amount of its installed physical memory.

In a true virtual memory system, there is no need to relate address space to physical memory addresses. Also, a true virtual system has been regarded as a system which manages disk reads and writes for users rather than instructing the hardware to read and write data from disk each time a read or write command is issued. An example of such a system is the Pick Operating System. In this system, the data and program storage space of both RAM and disk are divided into blocks called "frames" which correspond to uniform size RAM pages containing usually 512, 1024, 2048, or, 4096 bytes. Each frame is referenced by a unique frame identifier (frame ID). Except for the utilization of a frame ID and a displacement value within such frame ID, the system does not utilize physical memory addresses or instructions which contain physical memory addresses. This eliminates the need to perform logical to physical memory address translations.

The Pick operating system has a virtual memory manager for tracking the location of data frames which works directly with disk and RAM storage. This virtual memory scheme ensures that frequently used data remains in memory as long as possible. Although this virtual memory scheme is flexible and efficient, there is the problem of allowing applications to continue to work, sometimes very slowly because of insufficient available memory or because of having to manipulate large sized files. To speed up performance of the virtual memory system, an LRU mechanism was added to the system.

While the LRU mechanism improved performance, it was discovered that way in which virtual processes are managed in terms of the allocation and deallocation of virtual memory can substantially affect overall system performance. The present invention recognizes that the traditional way of updating buffer age links when deactivating virtual processes in response process time expiration events or to page or frame faults can have a serious impact on overall system performance. More specifically, when a virtual process is deactivated because a particular frame being referenced was not in memory at the time (i.e., frame fault) or because the time interval allocated to the virtual process expired, the virtual system normally executes the required operations to bring in the requested buffer frame from secondary storage (e.g. disk) and update all of the buffer age links to indicate the location of the most recently used frame buffer. Further, the present invention recognizes that this can result in the incredible amount of valuable CPU time being expended in updating buffer age links to move buffer frames to a most recently used position even though these buffers may already be within a few locations from the most recently used position. The main reason for this is that manipulating buffer age links within main memory has proved to be a very time consuming process. Therefore, while the system performed well in the case of Pick operating system implementations, performance was notably less when Pick applications were required to run under other operating systems, such as UNIX types of operating systems.

Accordingly, it is a primary object of the present invention to provide an LRU method and mechanism which significantly enhances the performance of a virtual memory system used in a variety of different operating system environments.

SUMMARY OF THE INVENTION

The above objects and advantages of the present invention are achieved in a preferred embodiment of a buffer table and aging (BTA) mechanism utilized by a virtual memory system in allocating virtual memory address space of main or primary memory (RAM) to one or more virtual processes. The virtual memory address space of the preferred embodiment is divided into a plurality of equal size virtual memory buffers, each buffer containing a frame or page which contains a predetermined number of bytes (e.g. 512, 1024 etc.).

The BTA mechanism of the preferred embodiment comprises a plurality of components which include an addressable buffer control (BC) table structure and an age (AG) table structure. The BC table structure is used for storing control and status entries, each entry being associated with a different virtual memory buffer and controlling access to its associated virtual buffer. The AG table structure contains a plurality of entries associated with the BC table entries and corresponding buffers. The AG table entries include a most recently used (MRU) pointer for designating the most recently used virtual frame buffer and a least recently used (LRU) pointer for designating the least recently used virtual frame buffer. These pointers are used for tracking the aging of such buffers in a forward direction from most recently used (MRU) to least recently used (LRU) or in a backward direction from LRU to MRU. Each of the remaining entries includes a forward and backward age pointers for linking the buffer table entries together so as to define an age chain for the associated virtual buffers. The backward age pointer designates the next least recently accessed virtual buffer while the forward age pointer designates the next most recently accessed virtual buffer.

According to the teachings of the present invention, each BC table entry is associated with a reference counter for maintaining a reference count of the number of times that its associated virtual memory buffer has been accessed for use by a virtual process. Each time that a virtual process accesses a virtual memory buffer, the frequency reference counter is incremented by one. The only time that the buffer age table is updated is when there is a need to make a virtual buffer available. That is, the buffer age table entries are updated only when the system needs to replace the contents of a virtual memory buffer in main memory with a frame obtained from secondary storage (i.e., replacement operation). This mode of operation results in a dramatic change in the way the prior art LRU mechanism operated and provides a phenomenal increase in system performance because it reduces to a minimum, the number of operations required to be performed in updating age table entries.

The first aspect of this mode of operation is that it recognizes that the buffer age table does not have to be updated at all when another virtual process is dispatched. In such cases, it is only necessary that the system update the reference counter associated with each virtual buffer entry. The second aspect of this mode of operation is that the buffer age table is updated only in the case of a replacement operation and that such updating be carried out according to specific criteria to maximize performance.

In the preferred embodiment, the specific criteria is established by two types of thresholds. The first type of threshold is a user based threshold which defines frequency of user process access in terms of a reference count contained in the reference counter associated with the particular buffer BT control entry. The threshold values for this type of threshold are established as percentages of the number of system users. When the established user threshold count is exceeded within a given period of time, this indicates that the virtual memory buffer is more likely to be referenced again. Therefore, the virtual buffer is allowed to remain intact in memory and is not considered as a candidate for replacement.

The second type of threshold is a depth threshold which specifies a particular depth or distance for the buffer table entry measured from the bottom of the buffer control table. The values for this type of threshold are established as percentages of the total number of virtual buffers and define their relative aging in terms of their positioning within the age table. For example, if the depth threshold is set to be $\frac{1}{16}$th of the total number of buffers, those buffer entries positioned within lower 16th portion of the buffer table as defined by the distance from the LRU position of the age table are the buffers which are possible candidates for replacement.

As indicated, the values for these two types of thresholds are initially set to values which ensure that the true least recently used (LRU) buffer will be selected as the candidate for replacement. The threshold values may be derived from performing statistical measurements on the particular hardware platform on which the virtual processes are being executed. It will be appreciated that the threshold values can be dynamically set on a periodic basis.

As part of processing input/output requests made by virtual processes for transferring new data into memory from secondary disk storage, the system's disk process determines which virtual buffer is available according to the established first and second types of thresholds for an available virtual buffer by searching through the age table starting from the bottom or least recently used (LRU) position of the table. When the process locates a virtual buffer entry within the specified portion of the buffer control table as measured by the age table mechanism which contains a reference count which is less than the established threshold and the associated buffer is otherwise available, the process will read the requested frame into the virtual buffer and move that buffer entry to a predetermined position within the BT table. At that time, the associated reference count is reset to zero. In the preferred embodiment, the buffer entry is moved to the top of the BT table by updating the AG table entries to reflect moving the available buffer to the most recently used (MRU) position of the buffer table (e.g. a move to top operation is performed).

When process locates a virtual buffer entry within the portion of the buffer table specified by the second type threshold which contains a reference count which is greater than the predetermined threshold, the process resets the reference counter to zero, moves the entry to the predetermined position within the BT table and continues examining buffer table entries. This ensures that more frequently accessed buffer table entries remain in memory rather than be allowed to drift toward the bottom of the bottom of the BT table to become candidates for replacement since there is likely probability that the associated buffer will be referenced again.

From the above, it is seen that interaction and combination of two different types of thresholds together with delaying the updating of the age table entries until an available virtual memory buffer is needed ensures extremely high performance. The present invention enhances performance by eliminating the need to perform time consuming age updating operations and by postponing entry moves (e.g. move to top operations) for as long as possible. Additional performance gains are achieved by causing the buffers which are most likely to be candidates for replacement to be located in the bottom part of the age table which results in shorter search times for an available buffer.

The above objects and advantages of the present invention will be better understood from the following description when taken in conjunction with the accompanying drawings.

DESCRIPTION OF THE PREFERRED EMBODIMENT

FIG. 1

Figure 1:
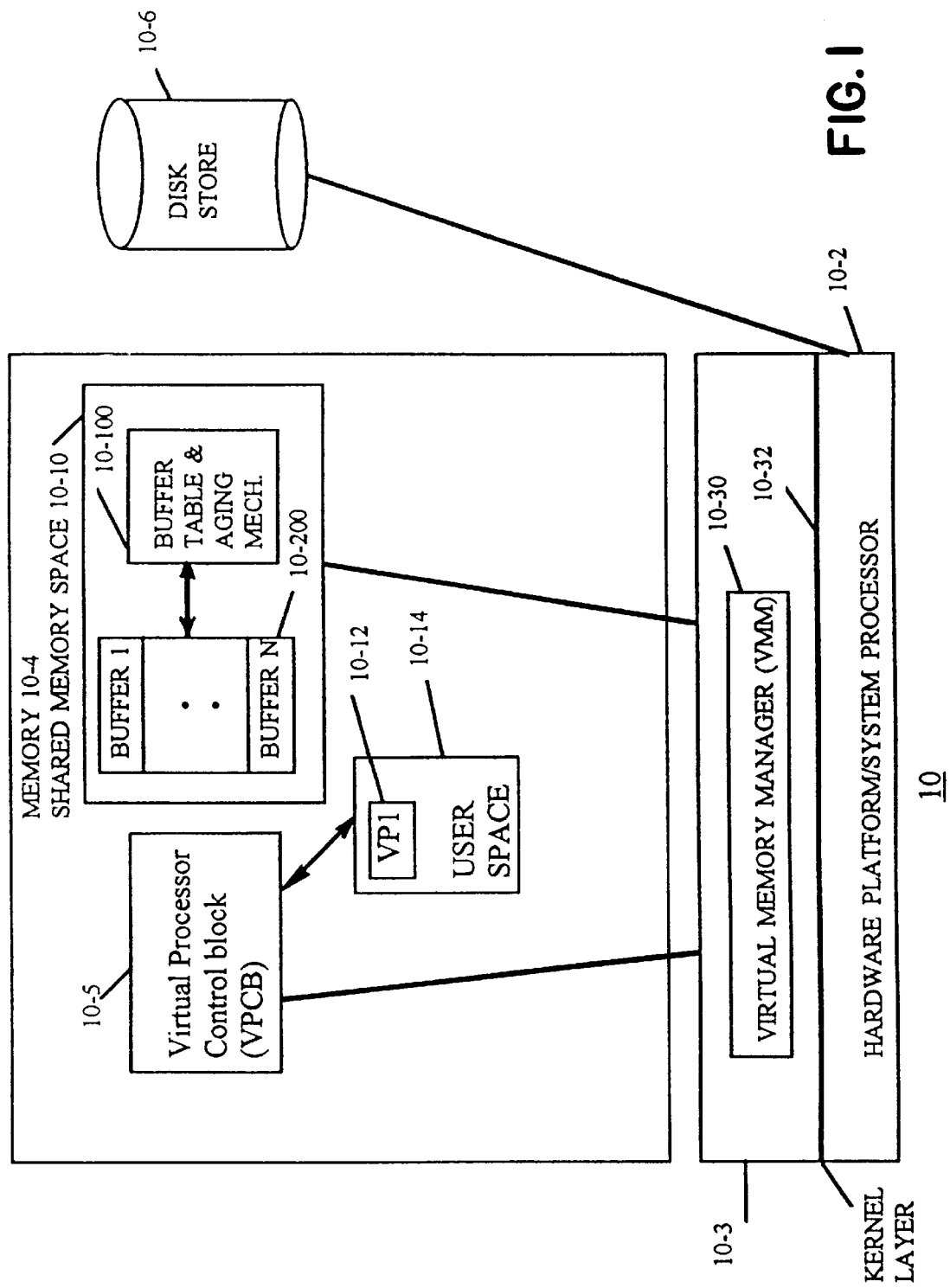
FIG. 1 is a block diagram of a system which incorporates the buffer table and aging mechanism of the present invention.

FIG. 1 shows in block diagram form, a computer system 10 which incorporates the buffer table and aging mechanism of the present invention. As shown, computer system 10 comprises a hardware platform 10-2, a primary storage unit such as a main memory 104 and a secondary storage unit such as disk device 10-6 which couple together in a conventional manner indicated in FIG. 1.

For the purposes of the present invention, the computer system 10 may be constructed from standard elements. For example, the hardware platform 10-2 may be implemented from the PowerPC system architecture and include a number of system processors, each of which include standard processor components such as a complete complement of hardware registers and an arithmetic and logic processing facilities in addition to other units. Further, the hardware platform system processors each has an instruction repertoire which provides the capability of performing "atomic" operations. The hardware platform 10-2 operates under the control of an operating system 10-3 such as a UNI® type operating system 10-3 (e.g. IBM AIX 4.11 operating system) or a version of the PICK operating system which operates alone or in conjunction with the UNIX type operating system (e.g. ported to run as an application under the UNIX type operating system). In either case, the operating system 10-3 is one which provides a true virtual memory multi-user environment in that it manages disk read and write operations rather than in response to each read or write command instructing the hardware platform to read or write the data from the disk storage.

In the preferred embodiment, the data and program storage space of both main memory 104 and disk storage 10-6 are divided into "frames" or pages, each having a fixed number of bytes. The frames may have different sizes (e.g. 512, 1024, 2048). Each frame is referenced by a unique frame identifier (FID) value. For programming purposes, the frames on disk storage 10-6 are organized into "groups" of frames and a file is usually divided among several groups.

As shown in FIG. 1, the operating system 10-3 of the preferred embodiment includes a virtual memory manager (VoM represented by block 10-30. The VMM 10-30 communicates with a kernel layer 10-32 which interacts directly with the hardware platform 10-2 and the different input/output devices connect to the platform such as disk device 10-6, user terminals, etc. The VMM 10-30 performs the function of translating each frame ID into a virtual buffer address. The kernel 10-3 includes a dispatcher mechanism for allocating system processor time to the virtual processes such as VPI of block 10-12 running in user space 10-14 enabling execution by one of the hardware platform system processors, each of which is represented by a virtual processor control block (VPCB) 10-5 in main memory 104 as shown in FIG. 1.

As shown in FIG. 1, memory 104 includes an area of virtual memory space 10-10 allocated by the system 10 which is shared among all of the virtual processors being executed by system 10. In the preferred embodiment, each such virtual processor is implemented as a UNIX type process. The shared virtual memory space 10-10 includes two major components, a buffer table and aging mechanism 10-100 and a plurality of frame buffers 10-200. The mechanism 10-100 controls what information or data is stored in the frame buffers 10-200 in response to requests made by the virtual processes which are read from disk storage 10-6.

FIG. 2

Figure 2:
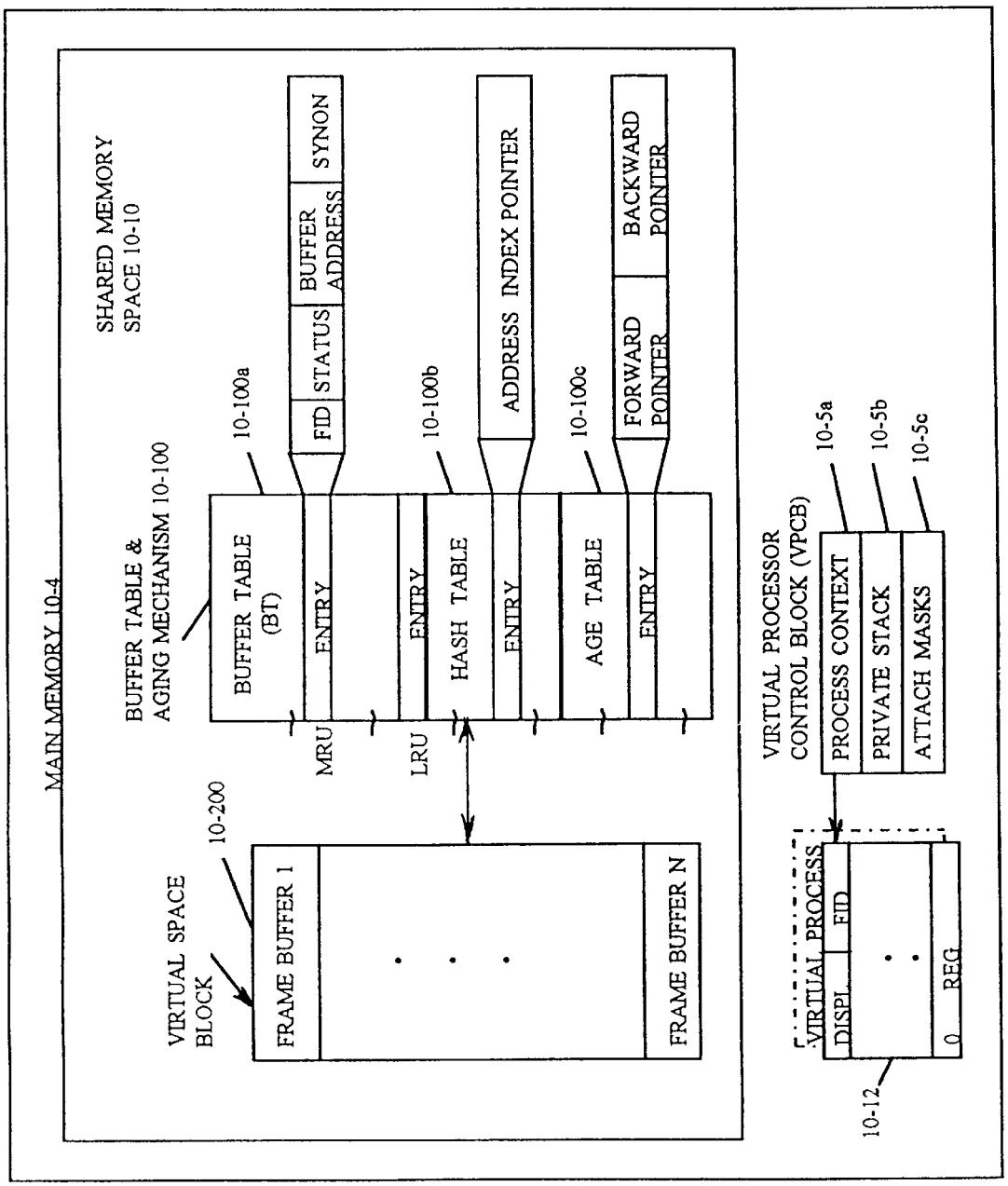
FIG. 2 shows in greater detail, the different memory components of the system of FIG. 1.

FIG. 2 shows in greater detail, the different control and data structures which comprise buffer table and aging mechanism 10-100, virtual process VPI and virtual processor control block (VPCB) 10-5 stored in the main memory 10-4 of FIG. 1 when system 10 incorporates the control mechanism of the present invention. Referring to FIG. 2, it is seen that the virtual process VP1 of block 10-12 includes a number of frame address registers used for storing address values for referencing the virtual memory frame buffers of block 10-200. Each address register contains sufficient storage bit positions for containing a displacement value and a frame identifier (FID) value.

As discussed herein, when the dispatcher mechanism activates or dispatches a virtual process, it causes the "attaching" of all of its associated frame registers. Attaching refers to the case where a virtual frame register of a virtual process has a corresponding entity in memory that can be directly addresses by a system processor's addressing facilities. In the preferred embodiment, "attaching" is accomplished by marking the buffer table entry designated by the buffer address contents of the register as being associated with a particular system virtual processor (i.e., setting an "attach" processor flag used to identity that particular processor).

Before such attaching occurs, the dispatcher mechanism causes the VMM 10-30 to translate the virtual address contents of all of its frame registers into main memory buffer addresses (i.e., effective addresses) using the buffer table & aging mechanism 10-100. The resulting translated buffer addresses are then stored in system processor's "live" hardware registers. Then, the particular system processor sets the associated buffer table entry "attach" bits. From this point on, the VMM 10-30 is required to perform no further virtual address translations unless a frame identifier value change is made in a frame register.

As mentioned above, each system processor has its own virtual processor control block 10-5. As shown, system processor VPCB 10-5 includes a plurality of sections which correspond to process context section 10-5*a*, an attach (private) stack section 10-5*b* and an attach masks section 10-5*c* The process context section 10-5*a* defines the context of the associated process (i.e., the contents of its address space, hardware registers and kernel data structures that relate to the process). The attach masks section 10-5*c* stores mask values used for designating which bits in the buffer table status words of the buffer table entries correspond to the attach status bits of the associated virtual processors.

The private stack section 10-5*b* is used for storing buffer address entries referenced by a virtual process being executed by that virtual processor. When a buffer "attach" bit is set for the first time indicating that the frame buffer has been attached by a particular system processor/CPU, the address of the attached buffer table entry is pushed onto the stack 10-5*b*. Such "attach" bits are independent of each other. That is, in a multiprocessor environment such as in the case of the preferred embodiment, it is possible to have multiple system processor (CPU) "attach" bits set for the same frame in the same buffer table status word of a particular buffer table entry.

The buffer table and aging mechanism 10-100 includes three major components. These are a buffer control (BC) table 10-100*a*, a hash table (HT) 10-100*b* and an aging table structure (AG) mechanism 10-100*c*. The BC table 10-100*a* is used for storing buffer control and status entries. Each entry stored is associated with a particular one of the number of virtual memory buffers of virtual space block 10-200 established by the system 10 during initialization and is used to control access thereto. As indicated, each entry is four words in length and is formatted to include a frame identifier (FID) word portion containing the FID of its associated buffer, a status word for storing predetermined status information pertaining to the buffer utilized according to the teachings of the present invention as discussed herein, a buffer address word containing the address of its associated buffer and a synonym word containing a synonym which further defines the buffer address. The status word is shown in greater detail in FIG. 3 and will be later discussed with reference to that figure.

The hash table 10-100*b* is used for locating virtual frame buffer entries within the BC table 10-100*a* by performing a hashing operation on an input address. Hash table 10-100*b* contains a number of hash entries per buffer table entry, each of which is formatted as shown. More specifically, each hash entry contains an address index pointer containing an address index pointer value which points to a particular one of the BC tables entries in table 10-100*a*. The number of hash entries is variable and must be a multiple or power of 2. In the preferred embodiment, there is a 4 to 1 ratio; that is there are 4 times as many hash entries as there are buffers. This ratio provides a large enough granularity that rarely gives rise to collisions or synonyms. The system processor takes the frame ID that is being searched for, ANDs it with a predetermined hash mask value and uses the resulting address as an index into the hash table for locating the address of the first buffer table entry which could potentially be the one addressing the virtual buffer containing that particular frame (i.e., containing a FID which identically matches that FID being searched for).

The aging table mechanism 10-100*c* performs the function of linking buffer table entries together through double headed links so as to define an age chain for the associated virtual buffers. As shown, mechanism 10-100*c* includes a most recently used (MRU) pointer and a least recently used pointer (LRU) for designating which one of the virtual frame buffers is the most recently used and least recently used respectively. The MRU and LRU pointers are used for tracking the aging of the buffers in a forward direction from most recently used (MRU) to least recently used (LRU) or in a backward direction from least recently used (LRU) to most recently used (MRU).

As illustrated in FIG. 2, aging (AG) table mechanism 10-100*c* includes a plurality of entries, each formatted to have forward and backward pointer portions for storing forward and backward age pointers (FAGE and BAGE) for linking their associated buffer entries together so as to define an age chain for their respective virtual frame buffers as discussed above. The backward age pointer of each entry designates the next least recently accessed virtual buffer while the forward age pointer of that entry designates the next most recently accessed virtual frame buffer. The double linked list organization provides very fast removal and insertion of entries in list or age chain. For the most part, this organization can be considered conventional in design.

FIG. 3

Figure 3:
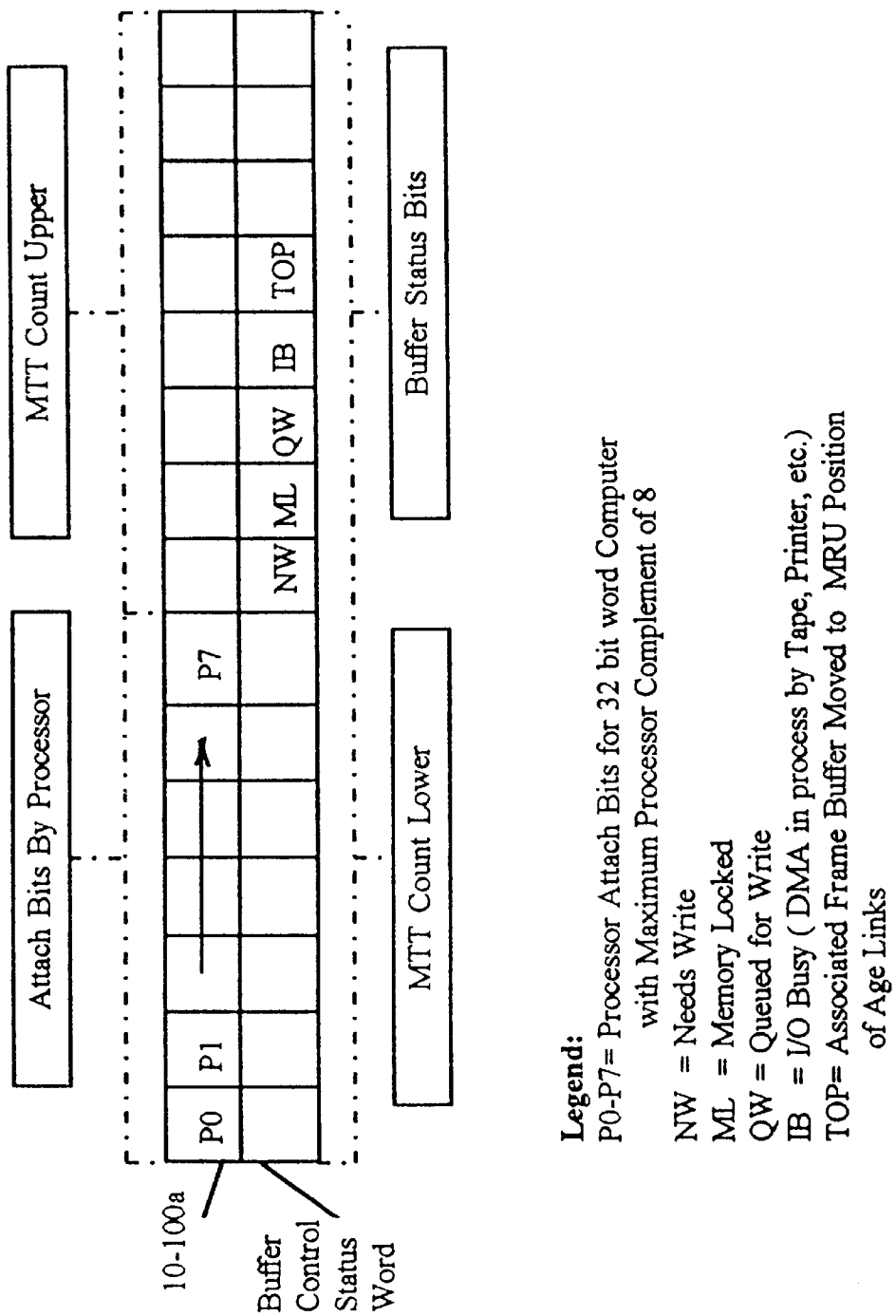
FIG. 3 shows in greater detail, the organization of entries stored in the buffer table and aging mechanism of FIG. 1.

FIG. 3 illustrates the format of the status word of each buffer control entry according to the teachings of the present invention. In the preferred embodiment, it is assumed that the hardware platform 10-5 has a 32 bit size word and can include a maximum of 8 system processors or CPUs.

As shown in FIG. 3, the 32 bit status word is divided into three sections, a processor attach bits section, a reference counter section and a state bits section. The processor attach bits section contains 8 bit positions allocated for storing the states of the processor attach bits indicating which of the 8 processors are executing processes which are utilizing the particular frame buffer. The bit positions are ordered as indicated in FIG. 3 wherein processors P0 through P7 are assigned bit positions 0 through 7. The reference counter section contains 16 bit positions for storing the 8 move to top (MTT) count upper bits and 8 MTT count lower bits of a reference count value which indicates the number of times an associated virtual frame buffer has been accessed by unique virtual processes over a period of time.

The state bit section contains 8 bit positions for storing the states of particular status indicators designating certain conditions which make the particular frame buffer unavailable for use as a replacement candidate in addition to status relative to the position of the frame buffer. In the preferred embodiment, the status indicators include a needs write (NW) indicator, a memory locked (M) indicator, a queued for write (QW) indicator, an I/O busy (IB) indicator and a top (TOP) indicator. The state of the NW bit position is set to a ONE when the frame is "dirty" indicating that the frame buffer has been written into by a virtual process at some point in time between the time in was brought into main memory from disk storage and the time that it is being now accessed such that the copy on disk storage is no longer valid. That is, the contents of the frame buffer are required to be written back to disk storage before the frame buffer can be freed up.

The ML bit position is set to a ONE when main memory is locked specifying that the frame buffer associated therewith is not a candidate for replacement. In UNIX terminology, the frame buffer is "pinned" or non-pagable. The QW bit position is set to a ONE when the system kernel's I/O disk processor (i.e., kernel I/O subsystem) has entered a request in a write queue to have the contents of the particular frame buffer written back to disk storage. The IB bit position is set to a ONE by the system 10 to indicate that there is a direct memory access (DMA) cycle being performed by an I/O device, tape device, printer etc. The TOP indicator is set to a ONE when the frame buffer associated therewith is inserted at the most recently used position within the age link structure as described in greater detail with reference to FIG. 7.

FIG. 4a

Figure 4A:
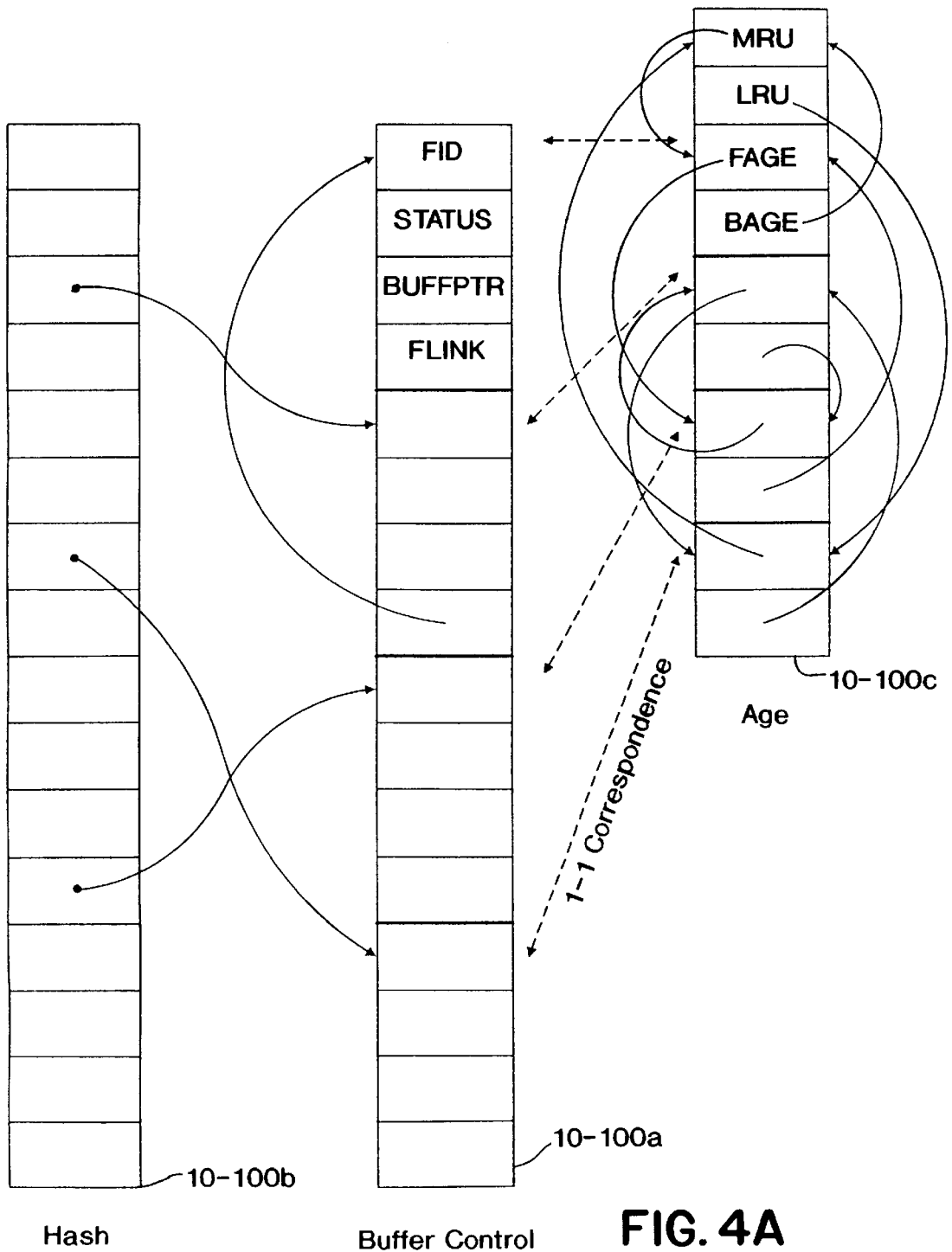
FIGS. 4a through 4c illustrate the interrelationships of the different components of the buffer table and aging mechanism of FIG. 1.

Before describing the operation of the present invention, it is helpful to discuss in greater detail, the operational relationships of the buffer table components relative to a particular configuration. FIG. 4a diagrammatically illustrates the operational relationships between the different components of buffer table (BT) and aging mechanism 10-100. As discussed above, there is a 4 to 1 ratio between the number of hash table entries and buffer table entries. Thus, FIG. 4a shows 16 hash table entries in table 10-100b and 4 buffer control table entries in table 10-100a.

The arrows from the hash table entries to the buffer table entries indicate that such hash entries contain pointers to the designated buffer table entries. The hash table entries shown as not having arrows contain "null" values. The dark lines separating each group of 4 elements labeled FID, STATUS, BUFFPTR and FLINK define the 4 different buffer control entries, each of which contain 4 words. The dashed arrows indicate the one to one correspondence between a buffer control entry and an age table entry, each of which is two words in length.

During operation, in response to frame reference request made by a virtual process, a system virtual processor executing the virtual process performs a hash operation to develop the input address which is to be used as an index into hash table 10-100b. The processor uses the hashed address to retrieve the contents of the hash table entry from table 10-100b. If the entry does not contain a "null" value, this indicates that there is at least one frame in the buffer table that matches the hash address. The virtual processor performs a comparison operation in which it compares the full 32 bits of the frame ID (FD) contained in the FID field of the hash entry with the FID value contained in the FID field of the buffer table entry. If the FID values do not match identically, the virtual processor then uses the address contained in FLINK field of the buffer table entry which always point to synonym entries as another hash table entry to access a next buffer table entry.

In this particular configuration, since there are 16 hash table entries, the hexadecimal value of "0f" is used as a hash mask. If the search mechanism is looking for frame ID2 (i.e., hexadecimal value of 2), it takes the FID value and ANDs it with the hash mask value "0f" which provides the hexadecimal of "02". Because the table is zero indexed base, the virtual processor is taken to the third block and it is assumed that the FID field of the entry that it references (i.e., the second buffer control entry) contains the FID hexadecimal value "101" which matches that FID rather than a FID hexadecimal value of "1". Since the Boolean AND for hexadecimal values "101" and "1" are identical, both hash to the same buffer table entry. Since the FID hexadecimal value "101" in the first buffer table entry produces no hit, the processor examines the FLINK field of that buffer table entry. Since the FLINK field does not contain a "null" value, the forward pointer value takes the processor to the FID of the first synonym which may contain a FID hexadecimal value of "201" or "1".

If the first synonym contains a FID hexadecimal of "1", the processor signals a "hits". If the FID hexadecimal is not "1", then the processor examines the FLINK field of the first synonym. If the FLINK field contains a "null" value, as in this particular case indicated by no pointer value emanating from it, the processor signals the operating system kernel that the particular buffer frame is not in memory. From this example, it is seen that the larger the hash table is in relation to the number of buffer table control entries, the less likelihood of having synonyms.

As previously discussed, FIG. 4a illustrates the one to one correlation between buffer table control entries and age table entries. This relationship is established because of the tables having been constructed such that the base address of each table is set at a very specific location so that it is only possible to perform a limited number of simple operations on addresses such as the subtraction of substitute addresses and the left or right shifting of a single bit as a function of the direction in sequencing back and forth between tables. The fact that the buffer address can not be used to calculate the address of its buffer control entry is not required in that the memory blocks or segments initially allocated by the operating system do not have to provide for contiguous addressing.

As illustrated in FIG. 4a, each age table entry contains a forward age pointer (FAGE) and a backward age pointer (BAGE) for each corresponding buffer table entry. The arrows indicate tags. All such address pointers whether a FAGE or BAGE always point to the top of the next entry structure (i.e., to the FAGE address) as indicated in FIG. 4a. Depending upon which address pointer chosen, it is possible to sequence through the age link chain from MRU to LRU or from LRU to MRU. To locate an available buffer, the system starts with the LRU pointer at the top for which there is no associated buffer control entry and no associated buffer and walks backwards through the age chain until the system reaches a pointer which designates the MRU indicating that the entire age chain has been traversed. The only time that the MRU pointer is used directly by the system other than for comparison purposes to detect "wrapping" is when inserting a buffer entry for a buffer which is required to made the most recently used entry. The entry is inserted into the position of the age chain which immediately follows the MRU pointer. That is, the link between the MRU pointer and the FAGE pointer of the entry designated by the MRU pointer and the link from the BAGE pointer of such entry are broken, the new entry is inserted before that entry and the age link pointers are rearranged so that a different buffer table entry now becomes the most recently used buffer entry.

The lines emanating from the different entries in FIG. 4a are used to indicate that a certain amount of activity has taken place in the buffer table because the MRU pointer does not point to the first FAGE pointer which in turn points to the next FAGE pointer of the next entry as is the case when the system is initialized.

FIG. 4b

Figure 4B:
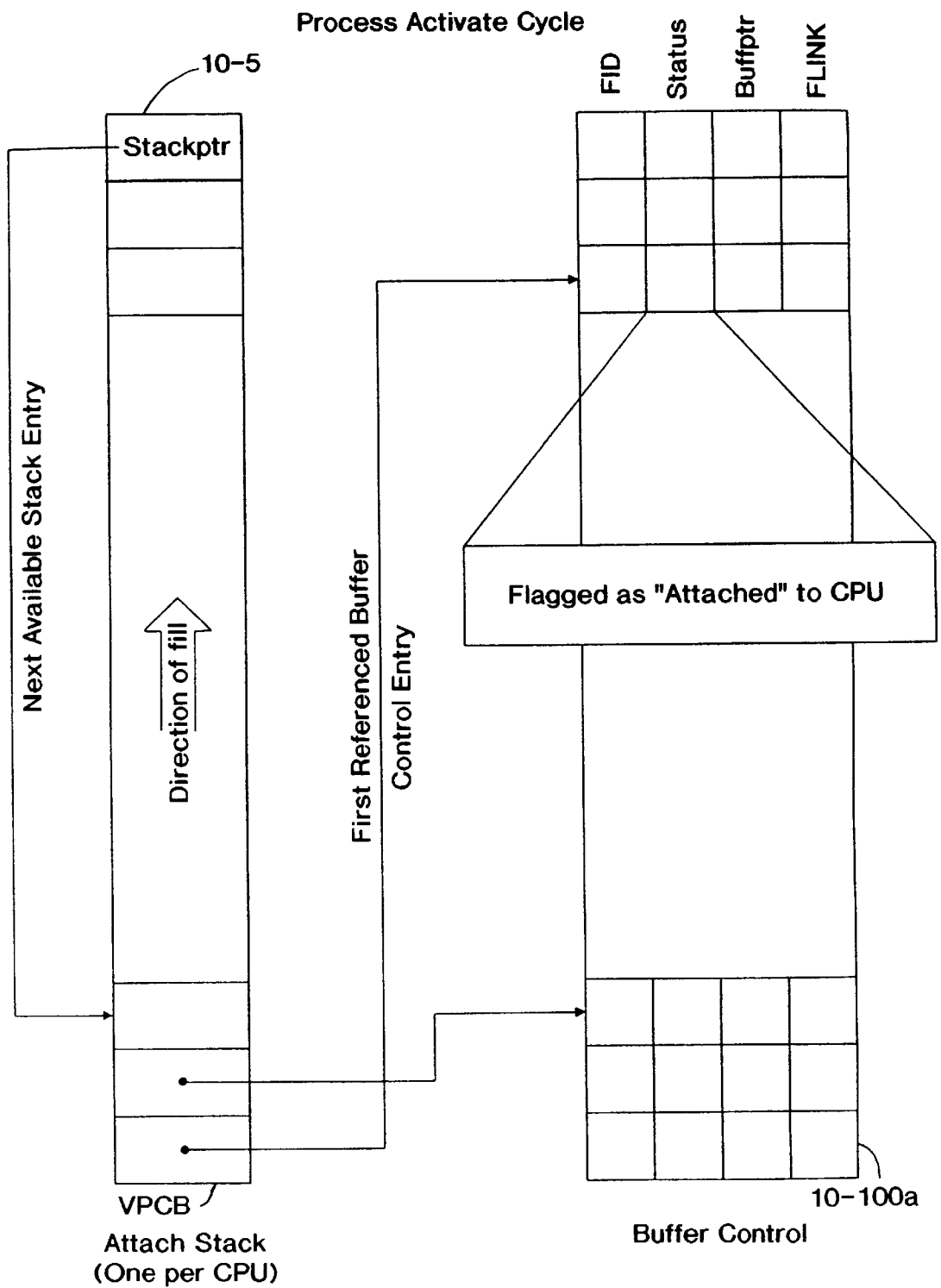

FIG. 4b diagrammatically illustrates how unique frame references made by a virtual process during a process activation cycle are tracked. At the time that the system process dispatcher within kernel 10-3 (i.e., process control subsystem) determines that it is appropriate to schedule a process for execution, it initiates a process activation cycle wherein it begins by initializing certain sections within the virtual processor control block 10-5 of the system processor assigned to run the virtual process. One such section is the attach stack section 10-5b which as mentioned is unique for each virtual CPU. There is a process attach stack for each virtual processor (CPU) or virtual process (VP0, VP1) which shares a particular CPU of the hardware platform 10-2 of FIG. 1. Another section of the block 10-5 which is initialized is the attach mask section which contain processor flag bits which are set to indicate what bit in the buffer status word of a buffer table entry of FIG. 3 is the attach status bit for the associated virtual processor (CPU).

Each time a virtual process is dispatched, the attach stack associated with that process is set to a "null" position. That is, the attach stack pointer is set to some depth within the attach stack as established by the virtual processor. The physical depth of the attach stack is established when system 10 is booted up. The logical depth of the attach stack determines the maximum number of frame references that a particular virtual processor can make to different frame buffers during a process activation cycle as defined by the where the stack pointer is placed in the attach stack. It will be appreciated that these settings can vary and are established as part of kernel's process scheduling function (i.e., scheduler). For that reason, these details are not further discussed herein.

The stack pointer at the time a process is originally determined to require servicing (i.e., needs CPU cycles) points to the last entry in the attach stack of FIG. 4b. Whenever a buffer frame is to be referenced, the dispatch mechanism searches the buffer table control entries to determine if the frame is in memory. If the virtual processor gets a hit when searching the buffer table entries going through the hash table 10-100b, it then checks the state of process attach flag bit in the buffer table status word using the specific processor attach flag stored in the attach stack section 10-100b of VPCB 10-5. If the flag bit is set or "on", this indicates that this is a repetitive attachment within this process activation cycle to this particular buffer frame. Therefore, the virtual processor makes no changes to the attach stack or buffer table. It just operates to resolve the buffer address and continues virtual process execution. If the corresponding attach processor flag bit in the buffer table status word is "off" or reset, then that flag bit is set to indicate that it has now been referenced once and the address of that buffer table entry is pushed onto the virtual processor attach stack 10-5b.

For any given virtual processor, every buffer frame that is referenced has an attach stack entry stored in the VPCB attach stack of the particular virtual processor whose process referenced the buffer table entry for that particular frame. This arrangement of the preferred embodiment solves a number of problems, one of which is that when looking for an available buffer, it is now can be assured that no buffer that has any one of the attach flag bits set will be over written because of another virtual process having referenced it.

Another advantage of the present arrangement is that only the entries which have discrete frame numbers can be pushed onto the stack. That is, it is only necessary to keep track of the number of uniquely addressed buffer frames that are referenced and not the number of memory references within a particular buffer frame by a given virtual process. During a process activation cycle and attach flag updates, buffer table references to set attach flag bits are performed until such time as the virtual process's time slice interval expires.

FIG. 4c

Figure 4C:
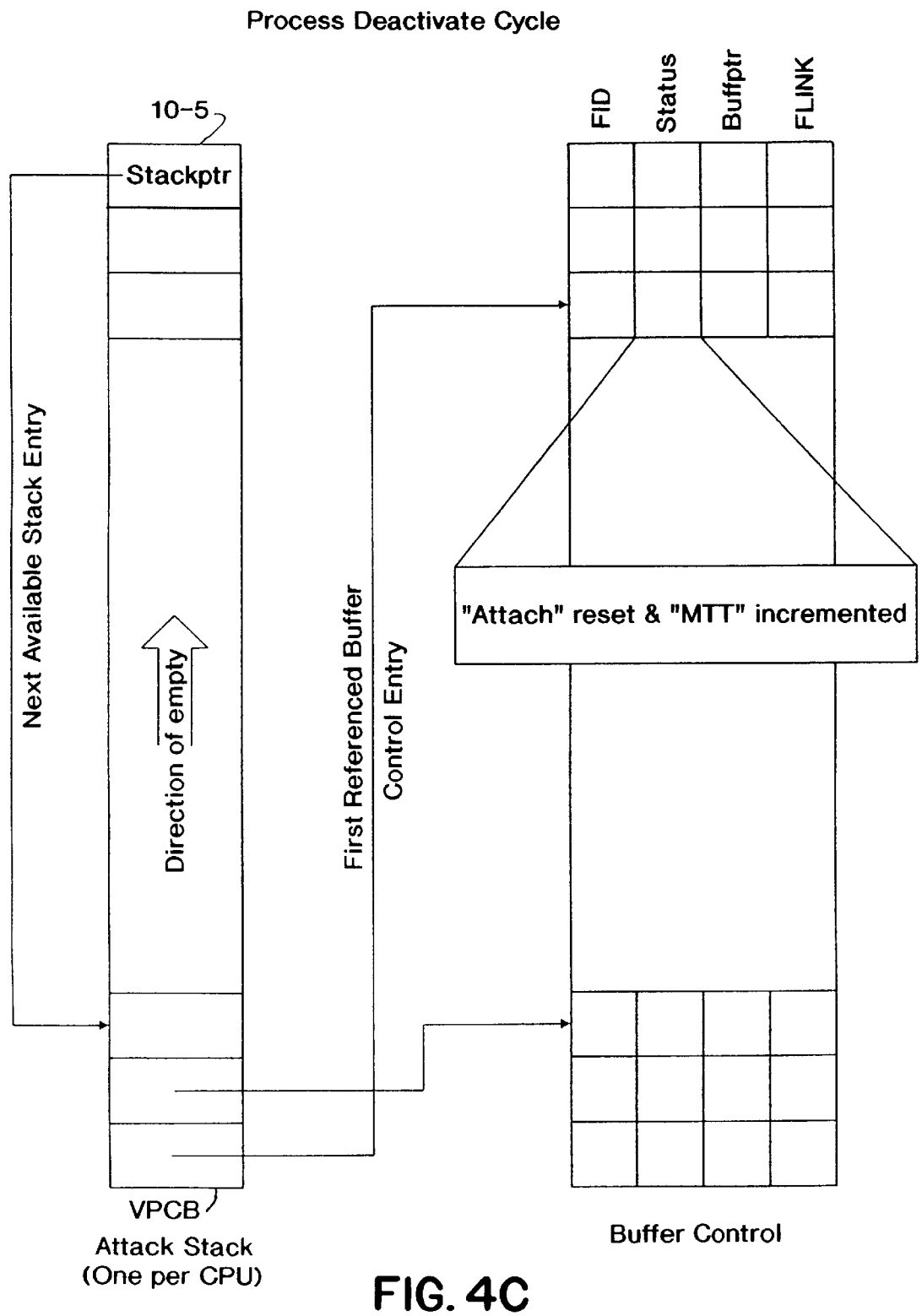

FIG. 4c diagrammatically illustrates the operational flow of a process deactivation cycle which shows the updating of frame buffer reference counters to reflect the number of unique references made during the execution of the particular virtual process being deactivated. A process deactivation cycle is initiated upon the occurrence of any one of the following events: the virtual process being executed issues a monitor call that requires that the process be deactivated, the process references a buffer frame that is not in memory, the process being executed issues a terminal device read, the virtual process detects that the attach stack is full or that the time slice period allocated to the virtual process has expired.

At process deactivation, the original attach stack pointer value (i.e., the value that is containing in the stack pointer at the time the process was originally activated) is used to "reverse pop" the stack. The stack pointer at the top of the stack is left alone while the virtual processor accesses the corresponding buffer table entry which is a direct memory reference in an "atomic" cycle and clears both the processor attach flag and increments the MIT reference counter bits by one. The processor compares the working attach stack pointer value against the value stored in the top of the stack itself to determine when all of the entries have been processed. If the pointer values are not the same, then the processor moves to the next entry and repeats the previously described operations.

In traditional mechanisms, some of which use a stack, at the time that the stack or the equivalent was updated, in addition to updating the buffer table status, such mechanisms would also update the age table by performing a most recently used operation which moved the buffer to the top of the age table chain. The philosophy was that every time a process stops referencing a buffer because it is time to dispatch a different process, it is also desirable to update the age table. As previously, discussed, this substantially decreases system performance. By contrast, the present invention eliminates the need to perform such updating and instead only performs an update operation when it is searching for an available buffer as a candidate for replacement.

DESCRIPTION OF OPERATION

Figure 5:
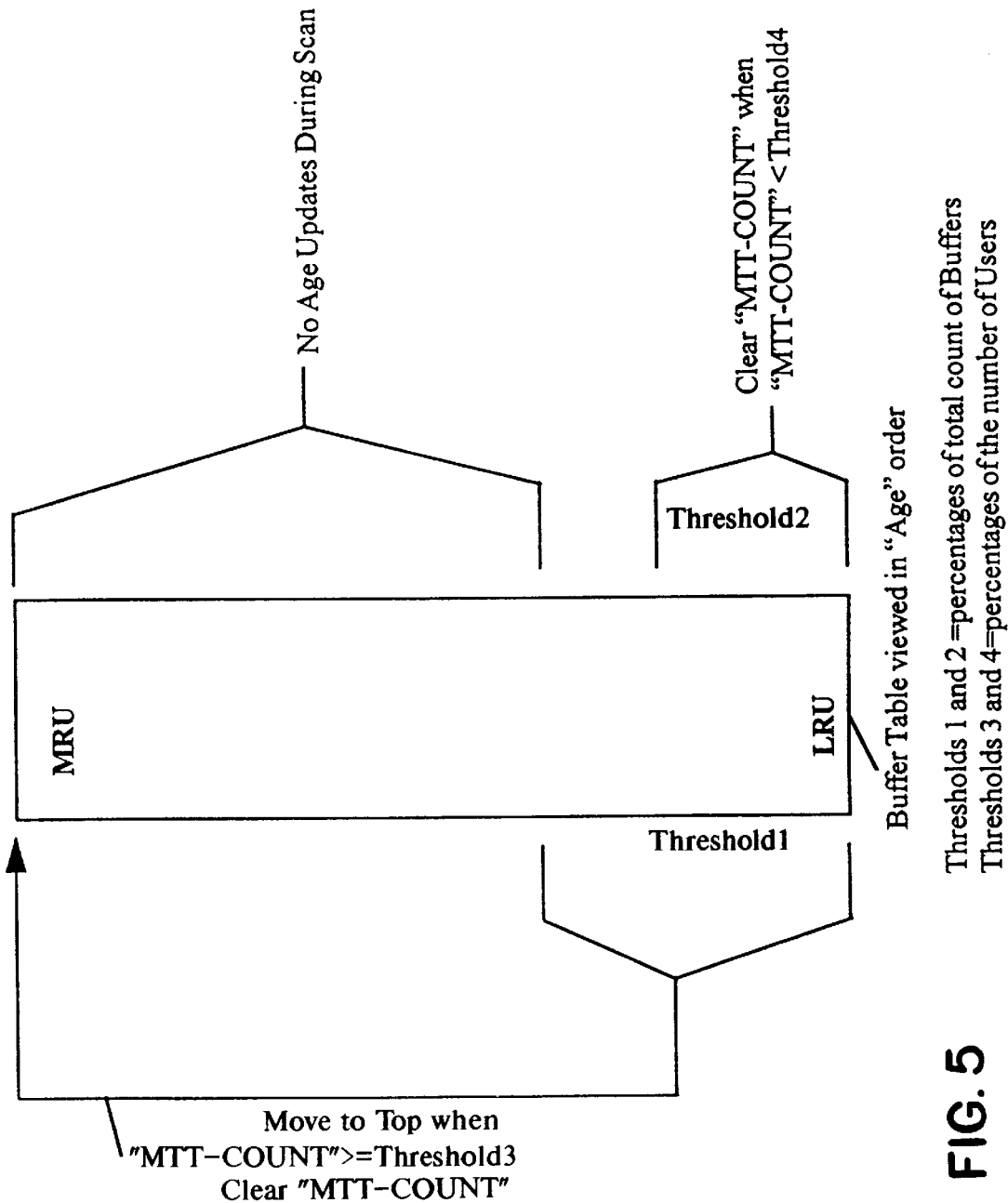
FIG. 5 illustrates the age ordering of the buffer table and aging mechanism of FIG. 1.

With reference to FIGS. 1 through 7, the overall operation of the preferred embodiment of the present invention will now be described. The operation can be divided into user processing flow illustrated in FIG. 6a and disk I/O processing flow illustrated in FIG. 6b. Before referring to those figures, reference is first made to FIG. 5. This figure diagrammatically illustrates an example of how buffer table entries appear when viewed in "age" order. As shown, the most recently used (MRU) buffer table entry is located at the top of the buffer table while the least recently used (LRU) appears at the bottom of the buffer table. According to the teachings of the present invention, the first type of threshold designated as thresholds 1 and 2 in FIG. 5 are buffer table depth threshold values which are defined as percentages of the total number of buffers. Additionally, the second type of threshold designated as thresholds 3 and 4 in FIG. 5 are user frequency of reference thresholds which are defined as percentages of the number of users of the system of FIG. 1.

Both types of thresholds can be dynamically settable by the system. More specifically at periodic intervals based on statistical averages, the system 10 executes a procedure which repeats the original computation of threshold values. The system 10 performs such computation based on the number of users who have been activated within the last period of time and based upon the size of the system and ratio of the number of users to the size of the system, it dynamically modifies such threshold values thereby allowing heuristic tuning. In the preferred embodiment, the very minimum time period used is one second while the maximum period is established as a function of the number of activations that have happened to discrete processes. It is the ratio of activations to the number of different users that will cause a change in threshold values. Also factored into to such computation of threshold values is the ratio of the size of the system to the number of users. For example, if the system provides facilities for 16 users and the memory size is a gigabyte, the system determines that there is no need to perform such computation. But, if the system is configured to provide facilities for 256 users and the memory size is 1 megabyte, this configuration causes substantial changes in the buffer table necessitating the system to perform periodic recomputations of threshold values.

The above values are combined so as to determine what the threshold values should be set at in order to maintain as the most recently used data, that data which is truly the most used data based on which process is the most active process. This ensures that system performance is maximized. In the system of the preferred embodiment, it is assumed by way of example that the buffer depth thresholds 1 and 2 could be initially set to values which specify table depths of ⅛ and ¹⁄₁₆ as measured from the bottom of the buffer table. Thresholds 3 and 4 could be set to values which specify reference counts of 32 and 16 respectively.

FIG. 6a

Figure 6A:
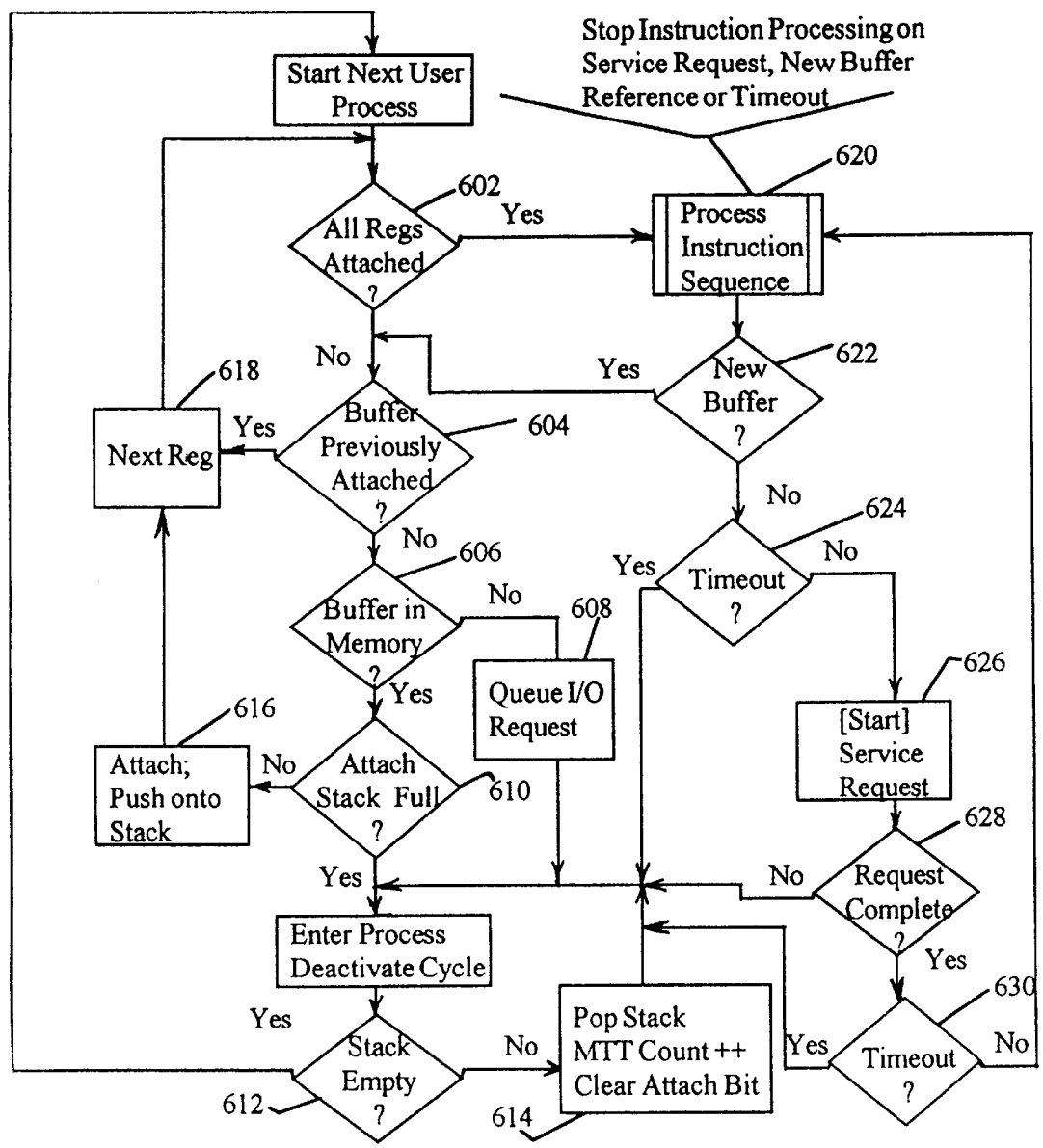
FIGS. 6a and 6b are flow charts used in describing the operation of the buffer table and aging mechanism of FIG. 1.

Referring to FIG. 6a, it is assumed that the system 100 has been appropriately configured and initialized to a "null" state which means that initially, no user processes are active. As indicated in block 600, the system dispatcher processor first determines if there is a virtual process which needs CPU cycles and initiates starting that user process as indicated in block 600. In the case where the virtual process was not previously activated, none of its 16 registers have been previously attached also meaning that their virtual address contents have not been translated into buffer addresses. Therefore, the particular virtual processor sequences to block 604. Prior to attachment, the VMM 10-30 translates the virtual address contents of the virtual process registers into buffer addresses after which the registers are attached to the particular system processor which is going to execute the virtual process.

That is, the VMM 10-30 performs the operation of translating the displacement and FID values of the virtual address contained in each virtual process register into a buffer frame address utilizing the buffer table 10-100, the result of which is then stored in a corresponding one of the 16 live hardware registers being used by the particular virtual processor. In greater detail, the frame number (FID) contained in the attach register is translated into a buffer address via buffer table mechanism 10-100 and the displacement value contained in the attach register is added to the translated address to provide the final effective address of the byte to be addressed (i.e. the architecture (e.g. instructions) of the preferred embodiment operates on a byte addressing basis). To locate the FID address, the FID address value is ANDED with the hashing mask value and the result is used as the index into hash table 10-100b which contains the address of the first buffer table entry which could possibly be the one for addressing the frame buffer containing that particular frame. A comparison is performed and when there is an exact match between FIDs, the translated buffer entry address contained in the buffer table entry is then added to the attach register displacement to produce the effective buffer address which is loaded into a specific one of the 16 system hardware registers for ready access.

Also, the virtual processor determines from the corresponding buffer control entry status if the buffer had previously been attached (i.e., block 604). This is done to prevent multiple entries from being loaded into the attach stack. As indicated, if the virtual buffer was previously attached, then it is known that the buffer table entry is already stored in the virtual processor's attach stack. Therefore, the virtual processor starts with the next register to be attached.

When the buffer has not been previously attached, the virtual processor next determines if the buffer frame is stored in memory (i.e., block 606). That is, the virtual processor uses the FID of the buffer frame being referenced the buffer table and aging mechanism 10-100 to determine if the buffer frame is in main memory. As discussed, when there is a comparison between the FID and FID of one of the buffer table entries, the mechanism 10-100 generates a hit signal indicating that the buffer frame is in memory. Next, as indicated in block 610, the virtual processor determines if the attach stack is full by examining the value of the stack pointer as described relative to FIG. 4c. Assuming that it is not full (i.e., there is room for another reference entry), the virtual processor pushes the buffer control table address onto the attach stack as indicated in block 616.

As indicated in FIG. 6a, if the attach stack is full, then the virtual processor deactivates the process by entering a process deactivation cycle wherein it performs the operations of blocks 612 and 614 as described in connection with FIG. 4c for updating the frequency reference counters associated with the frame buffers (i.e., increments by one, each reference counter of each buffer uniquely referenced during virtual process execution). As explained earlier, the virtual processor uses the original value of the stack pointer to "reverse pop" the attach stack. Using the buffer control table addresses obtained from the stack, the processor accesses the corresponding entries during atomic cycles of operation and clears or resets both their processor attach flags and increments the MTT reference counters by one until all of the attach stack address entries have been processed as indicated by block 612. After completing deactivation of the process, the system kernel dispatcher determines the next user virtual process requires CPU cycles.

Figure 6B:
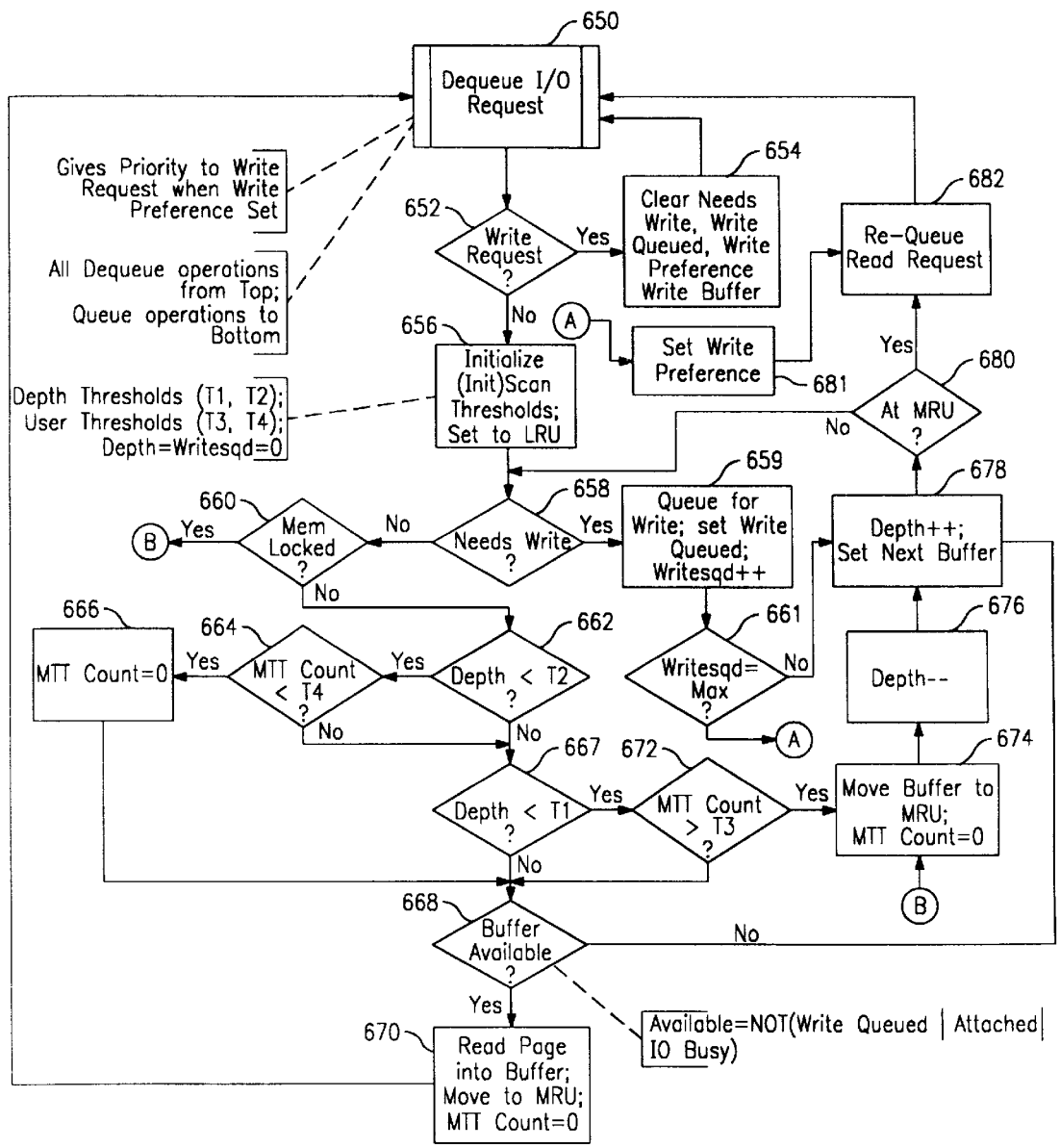

It will be noted that when the virtual processor ascertains that the buffer is not in memory, it issues a request for that buffer frame which it places on the I/O queue of the disk processor for servicing according to the flow chart of FIG. 6b (i.e., block 608). It then deactivates the virtual process as indicated in FIG. 6a.

As indicated in block 602 of FIG. 6a, when all of the registers are attached, the virtual processor now begins processing the sequence of instructions as indicated in block 620. During the processing of such instructions, it determines if the execution of the virtual process should be discontinued because of the occurrence of a service request, a new frame buffer reference or time-out condition. More specifically, if it determines that a new frame buffer is being referenced (i.e., block 622) which caused a change in the frame number contained in one of the virtual process's registers, this causes the virtual processor to go back and perform a search operation using the buffer control mechanism 10-100 to determine if the frame buffer had been previously attached (i.e., block 604) or is in main memory (i.e., block 606). If the buffer was previously attached, it is guaranteed to be still in memory. Therefore, the virtual processor just performs the virtual address translation to a buffer address. Because the process was not deactivated, the attach flag in the buffer table status word remains set and therefore, the virtual processor is done processing after completing the operations of blocks 610 and 616 in the manner previously described.

If there is no new buffer reference, then the virtual processor checks to see if the time period allocated to the virtual process has expired (i.e., block 624). If it has, the virtual process deactivates the virtual process. If a time-out did not occur, the virtual processor determines if a monitor call was issued by the virtual process for initiating a service request as indicated in block 626. It then checks to see if the request has been completed (i.e., block 628). This operational sequence occurs in a number of situations such as where a monitor call was issued requesting terminal input. In such instances, the process is deactivated during the time that the user is evaluating conditions to come up with an appropriate response. In the case of terminal input, when the system has a "type ahead" capability, the terminal input request could have been deemed completed by the user having previously entered input characters that satisfied the request. If the request is complete, the virtual processor again checks for the occurrence of a time-out as indicated in block 630 as in block 624. If the process time period has not expired, the virtual processor returns to block 620 and continues its execution of virtual process instructions.

FIG. 6b

FIG. 6b illustrates the sequence of operations performed by the kernel's disk processor according to the teachings of the present invention. As previously discussed, the disk processor is a UNIX type process which has been extended to perform the operations of the present invention illustrated in FIG. 6b in addition to those operations traditionally performed by such disk I/O background processes.

As indicated in block 608 of FIG. 6a, each time a referenced frame buffer is not found in memory, this causes the virtual processor to queue an I/O request for obtaining the frame buffer from disk store 10-6 of FIG. 1. Thus, disk I/O processing is the action invoked based on the virtual processor having determined that the frame attempted to be referenced by a particular virtual process was not in main memory 10-4. As indicated in block 650 of FIG. 6b, the disk I/O processor periodically examines its queue for requests requiring processing. In the preferred embodiment, when a write preference bit is set by the disk processor, write requests are given priority. In processing I/O requests, the disk I/O processor adds or queues requests at the bottom and removes or dequeues requests from the top.

After dequeuing the I/O request, the disk I/O processor first determines if the request is a write request (i.e., block 652). If it is, then it performs the operations of block 654 of clearing the needs write (NW) and write queued (QW) bits in addition to the write preference bit and causes the frame buffer to be written via the appropriate disk I/O driver software. When the request dequeued is a read request, then the disk I/O processor performs the operations of block 656 according to the teachings of the present invention. First, the disk I/O process initializes the depth and user frequency threshold values (i.e., T1, T2, T3 and T4) to be used by the disk processor in scanning the buffer control table for an available frame buffer as a replacement candidate for storing the data requested by a particular virtual process. Also, the disk 1,0 process sets up a buffer table pointer to the LRU buffer. These threshold values are stored as either C variables or in "active" registers of the virtual processor CPU as a matter of design choice. As discussed previously, the system can be configured to recompute these values on a periodic basis wherein the recomputed results are used to establish new threshold values.

As indicated in block 656, the disk I/O processor begins scanning the buffer control table entries of table 10-100a ordered as illustrated in FIG. 5 for an available buffer starting with the least recently used buffer position set in block 656. During such scan, the disk I/O processor examines specific ones of the control buffer state bits shown in FIG. 3 of the buffer control entry. That is, the disk I/O process examines the states of the NW and ML bits to see if the buffer needs to be written (i.e., block 656) or has been "memory locked" (i.e., block 660). When both bits are in a reset state, the disk I/O processor next checks if the table depth of the buffer table entry is less than the depth threshold value T2 (e.g. 1/16) as indicated in block 662. Since the buffer table entry being scanned is located in the least recently used position, its depth is less than the established depth threshold value. Therefore, the disk I/O processor next checks the reference count value contained in the MTT reference counter bit positions of the buffer control entry illustrated in FIG. 3 (i.e., block 664). If the MTT count is less than the established user threshold value T4 (e.g. 16) indicating that it has not been accessed sufficiently often to be retained in memory, the disk I/O processor resets or clears the MTT count to zero.

As indicated in block 668, the disk I/O processor next checks the states of QW, IB and attach processor bits to determine if the buffer which is a candidate for replacement is available. If all bits are reset, the disk I/O processor performs the operations of block 670. That is, the disk I/O processor reads the frame/page into the frame buffer and moves the buffer control entry to the most recently used position in the buffer table 10-100a as illustrated in FIG. 5. In the manner previously described, the move to top operation is carried out by updating or adjusting the age link pointers in the aging table mechanism 10-100c of FIG. 4a so that the available buffer entry is pointed to by the MRU pointer. Also, the disk I/O processor also clears to zero, the MTT count contained in the buffer control entry status word.

As indicated in block 664 of FIG. 6b, if the MTT count is not less than the T4 threshold, then the disk I/O processor performs the operation of block 667 to determine if the buffer control table entry is at a depth which is less than threshold T1 (e.g. 1/8). If it is, the disk I/O processor next examines the buffer control table MTT count (i.e., block 672) to see if it is greater than the threshold T3 (e.g. 32). If the buffer control entry count exceeds the established count, this indicates that the associated buffer has been accessed at a frequency rate sufficient to have it retained in memory. Therefore, as indicated in block 674, the disk I/O processor performs the operations of moving the buffer to the most recently used (MRU) position and clearing its MTT count to zero.

Next, the disk I/O processor determines if there are more buffer table entries to be scanned in locating a replacement candidate. As indicated in block 676, the disk I/O processor decrements a depth counter following the move to top operation which is being used by such process to indicate the depth where it is at in the buffer table (i.e., how deep within the age chain) relative to the distance from the least recently used toward the most recently used position. This is used to indicate how many buffer entries have been scanned by the disk I/O processor up to that point in time. The disk I/O processor increments the depth counter when it is set to examine the next buffer control table entry (i.e., block 678). As previously described, the maximum number of entries contained in the age table was established when the system was originally booted up. The depth counter is used to compare against the preset threshold values (e.g. T1 and T2) which are defined as some percentage of the maximum number of entries in the age table. Stated differently, the disk I/O processor maintains such counter values in order to keep track of how deep into the age table scanning has proceeded to determine what is the percentage of scan depth versus the maximum scan depth defined by the total distance between LRU and MRU positions as established at system boot time.

Next, the disk I/O processor determines if all of the buffer table entries have been scanned by determining if wrapping had occurred (i.e., reached the MRU pointer value contained in the age table as indicated in block 680). If wrapping occurred, the disk I/O processor requeues the read request as indicated in block 682. When the buffer replacement candidate is not available (i.e., block 668), the disk I/O processor increments the depth counter to begin examining the next buffer entry as indicated in block 678.

In the case where the NW bit of the control buffer entry is set (i.e., block 58), the disk I/O processor queues the buffer entry for writing, sets the write queued QW bit and increments a counter Writesqd used by the disk I/O processor to indicate how many writes are currently queued (i.e., block 659). Next, as indicated in block 661, the disk I/O processor checks to see that the capacity of the write queue has not been exceeded (i.e., block 661). If it has, then the disk I/O processor sets the write preference bit as indicated in block 681 and requeues the read request. When the counter Writesqd has not reached its maximum value, the disk I/O processor increments the depth counter for scanning the next buffer table entry (i.e., blocks 661 and 678).

The disk I/O processor continues executing the operations of blocks 658 through 680 until an available buffer is found or until all of the buffer table entries have been examined using the age table mechanism.

From the above, it is seen how the buffer table mechanism of the present invention is able to enhance system performance in allocating virtual buffers to virtual processes. By eliminating the need to perform time consuming age updating operations and by postponing buffer table entry moves (e.g. move to top operations) for as long as possible. Additional performance gains are achieved by causing the buffers which are most likely to be candidates for replacement to be located in the bottom part of the age table which results in shorter search times for an available buffer.

FIG. 7

While the above embodiment was described in terms of logically inserting buffers at the top of the buffer table, the use of a true age link mechanism such as mechanism 10-100, makes it possible to introduce a "move to middle" (MtM) concept or mechanism which increases the overall effectiveness of the virtual memory manager of the present invention. The MtM mechanism maintains a pointer to the "middle" of the age links at which a buffer may be logically inserted rather than being inserted at the MRU position as previously described. In so doing, buffers which have been accessed more recently and/or frequently such as those on the top half of the table are not affected by the age link manipulation.

The MtM mechanism is employed only when a frame is being read from disk (i.e., block 608 of FIG. 6a) causing the contents of a frame buffer to be replaced with that frame. In this case, since the buffer contents being read have never been truly referenced at this point, but rather only requested for reference, its insertion into the age links should be at a point which is far enough from the LRU position so as not to be a likely candidate for replacement and should not cause buffers which have been repeatedly referenced to become more likely candidates for replacement. The term "middle" while indicated in this embodiment as being the center can be any arbitrary point between the LRU and MRU positions (i.e., intermediate point).

The use of this mechanism is extremely effective when a process is scanning through a database and looking at each component of data only once, such as when performing a file copy or save operation. In either of these cases, if a Frame Read operation were to employ "move to top" rather than to "move to intermediate", the entire buffer space could be changed in a matter of seconds.

Figure 7:
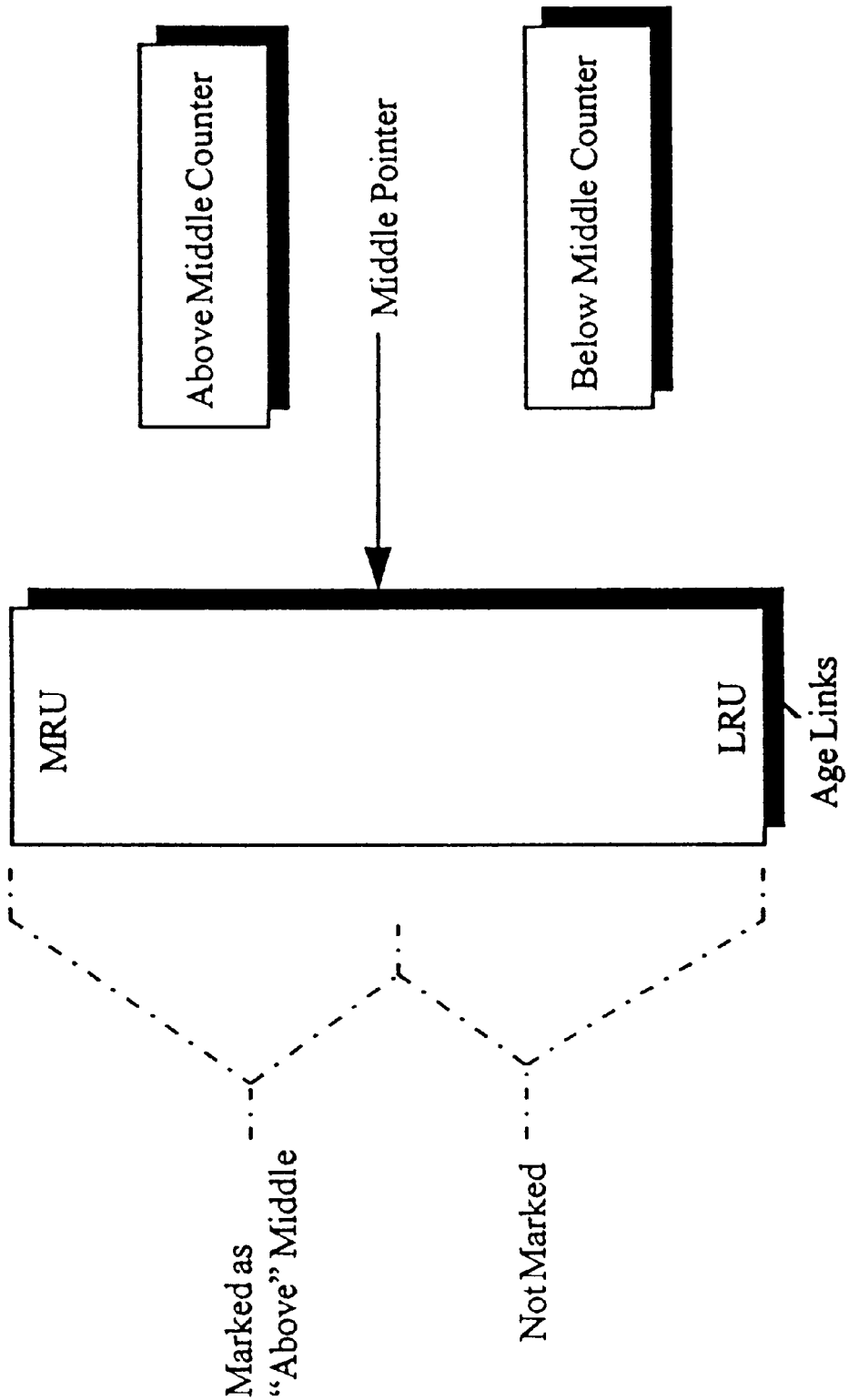
FIG. 7 illustrates a refinement of the embodiment of the present invention.

Referring to FIG. 7, it is seen that the MtM mechanism includes a pair of global counters, an above middle counter (Above_Mid) and a below middle counter (Below_Mid) along with a Middle pointer. These counters are employed together with the TOP bit of the buffer status word of FIG. 3 in establishing the value of the Middle pointer during system operation. The Middle pointer value is initially established when the BTA mechanism is initialized. The Middle pointer defines, the intermediate point within the buffer table into which the selected replacement candidate frame buffer is to be inserted.

The state of the TOP bit is used to reflect the relative position of the associated frame buffer (i.e., above or below the center or middle). This bit is set to a binary ONE whenever a frame buffer to be retained in memory is moved to the most recently used (MRU) position within the age links structure (i.e., when operations such as those of block 674 of FIG. 6b are performed). When the TOP bit is a ONE, this indicates that the particular frame buffer is located above the defined middle position within the age link mechanism. When the particular frame buffer selected as the candidate for replacement is inserted at an intermediate position within the age links, the TOP bit is reset to a ZERO. When the TOP bit is a ZERO, this indicates that the particular frame buffer is located below the defined middle position within the age link mechanism.

The operations performed by the MtM mechanism of FIG. 7 can be summarized as follows. When a frame buffer is removed from the age links in response to a disk read operation, the MtM mechanism uses the state of TOP bit in the BT status word to determine which one of the two global counters to decrement as follows. If the TOP bit is a binary ONE, the MtM mechanism decrements the Above_Mid counter count one. If TOP bit is a binary ZERO, the MtM mechanism decrements the Below_Mid counter by one.

When a frame buffer is inserted at the Most Recently Used location (MRU), the MtM mechanism sets the TOP bit in the BT status word to a binary ONE and increments by one, the count of the Above_Mid counter. When a frame buffer is inserted at the intermediate location (e.g. middle), the MtM mechanism resets the TOP bit to a binary ZERO in the frame buffer's BT status word and increments by one, the count of the Below_Mid counter.

At the completion of any buffer insertion operation, the MtM mechanism compares the counts of the Above_Mid and Below_Mid counters and if their counts differ by more than one, the MtM mechanism adjusts the Middle pointer up or down appropriately (i.e., set to the Forward or Backward Age pointer of the current Middle age entry), adjusts the counters and sets or resets a TOP bit as follows.

If the Middle pointer is being adjusted toward the MRU position of the age links (i.e., the Above_Mid counter<Below_Mid counter), the MtM mechanism sets the Middle pointer to the value of the Backward Age pointer of the Link (entry) addressed by the Middle pointer and resets the newly inserted Middle buffer's TOP bit to a binary ZERO;

If the Middle pointer is being adjusted toward the LRU position of the age links (i.e., the Above_Mid counter>Below_Mid counter), the MtM mechanism sets the TOP bit of the current Middle buffer to a binary ONE and then sets the Middle pointer to the value of the Forward Age pointer of the Link (entry) addressed by the Middle pointer.

From this, it can be seen that with the MtM mechanism, it is possible to establish as a buffer insertion point, an intermediate position within the age links for replacement candidate frame buffers thereby improving system performance when certain types of applications being run on the system. As discussed above, this intermediate position can be selected to be any point between the LRU and MRU positions of the age links structure or buffer table.

It will be appreciated that many changes may be made to the preferred embodiment of the present invention without departing from its teachings. For example, different intermediate pointer values may be used in conjunction with the teachings of the present invention. Also, the mechanism of the present invention may be used with systems having different architectures and operating systems.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. For use in a system having at least one processing unit, a main memory coupled to the processing unit and a secondary storage unit operatively coupled to the processing unit and to the main memory, the main memory containing virtual memory space shared by those virtual processes being executed on the processing unit, the virtual memory space including a specified number of virtual frame buffers for storing a corresponding number of frames transferred from the secondary storage unit by the processing unit in response to requests received from the virtual processes and the virtual space further including a buffer table and aging (BTA) mechanism associated with the virtual frame buffers for storing information values indicating the frequency of access and relative aging of virtual buffers in virtual memory space during the execution of the virtual processes, the BTA mechanism including a buffer table containing a plurality of entries which are associated with a corresponding number of virtual frame buffers for controlling access thereto and an age table containing entries associated with the buffer table entries which include a most recently used (MRU) pointer for designating the top table position or most recently used virtual frame buffer and a least recently used (LRU) pointer for designating the bottom table position or least recently used virtual frame buffer, each age table entry having forward and backward age pointers for linking the buffer table entries together so as to define an age chain for the associated virtual frame buffers, the backward age pointer designating the next least recently accessed virtual buffer and the forward age pointer designating the next most recently accessed virtual buffer, a method for increasing the efficiency of the BTA mechanism, comprising the steps of:

(a) associating a buffer table status control word with each buffer table entry, the status control word containing a number of bits allocated for maintaining a reference count of the number of times that an associated virtual frame buffer has been accessed;

(b) incrementing the reference count by one, each time the virtual buffer is uniquely accessed;

(c) updating the age table pointers for changing the ordering of entries contained in the buffer table only when searching for an available virtual frame buffer during a replacement operation wherein the contents of a virtual frame buffer are required to be replaced to make room for a frame requested by a virtual process which is to be transferred from the secondary storage unit; and, (d) selecting a virtual frame buffer as a replacement candidate according to defined criteria relating to depth of the frame buffer entry within the buffer table and the frequency of use by virtual processes as defined by the reference count contained in the status control word associated with a particular buffer table entry.

2. The method of claim 1 wherein step (c) further includes the step of:

(e) adjusting the forward and backward age pointers of the age table entries so as to move the virtual frame buffer entry associated with the virtual frame buffer selected as a candidate for replacement to a predetermined point within the buffer table.

3. The method of claim 2 wherein the predetermined point corresponds to an intermediate point within the buffer table.

4. The method of claim 3 wherein each buffer table status control word further includes a first indicator bit whose state is used to define the relative position of the associated frame buffer within the buffer table and wherein the age table mechanism further includes first and second global counters for storing first and second counts respectively defining frame buffer positions above and below the intermediate point within the buffer table and wherein step (e) further includes the step of:

(e1) maintaining an intermediate pointer defining the address of the intermediate point within the buffer table for inserting the frame buffer selected as the replacement candidate, the intermediate pointer being maintained using the first and second counts stored in the first and second global counters and the state of the indicator bit of the selected frame buffer.

5. The method of claim 4 wherein step (e1) of maintaining an intermediate pointer includes the steps of testing the state of the indicator of the frame buffer entry being removed from the age table during a replacement operation and decrementing the first and second counts of the first and second global counters respectively in accordance with the state of the indicator by performing one of the following operations:

when the indicator bit is in a first state, decrementing by one, the first count stored in the first global counter; or, when the indicator bit is in a second state, decrementing by one, the second count stored in the second global counter.

6. The method of claim 4 wherein step (e1) of maintaining an intermediate pointer includes the steps of:

(e2) during an insertion operation setting to a first state, the indicator bit of each replacement candidate frame buffer selected for insertion at the most recently used position of the buffer table as defined by the MRU pointer and incrementing by one, the first count of the first global counter; and, (e3) during an insertion operation resetting to a second state, the indicator of each replacement candidate frame buffer selected for insertion at the intermediate point within the buffer table and incrementing by one, the second count of the second global counter.

7. The method of claim 6 further including the steps of:

(e4) comparing the first and second counts stored in the first and second global counters upon completion of each insertion operation for determining if the intermediate pointer requires adjustment; and, (e5) when adjustment is required, adjusting the intermediate pointer by modifying one of the first and second counts stored in the global counters in a predetermined manner and in accordance with count adjustment, setting or resetting the indicator associated with the replacement candidate frame buffer.

8. The method of claim 7 wherein the intermediate pointer is adjusted when step (e4) indicates a difference of more than one between the first and second counts and wherein the step (e5) further includes the step of:

adjusting the intermediate pointer by setting the intermediate pointer to the forward or backward age link of the frame buffer entry located at the intermediate point of the buffer table by performing one of the following operations:

(1) when the intermediate pointer is being adjusted toward the most recently used position of the buffer table defined by the first count of the first global counter being less than the second count second global counter, setting the intermediate pointer equal to the backward age link of the frame buffer entry addressed by the intermediate pointer and resetting the indicator bit of the new frame buffer entry inserted at the intermediate point of the buffer table; or, (2) when the intermediate pointer is being adjusted toward the least recently used position of the buffer table defined by the first count of the first global counter being greater than the second count of the second global counter, setting the intermediate pointer equal to the forward age link of the frame buffer entry addressed by the intermediate pointer and setting the indicator bit of the new frame buffer entry inserted at the intermediate point of the buffer table.

9. The method of claim 8 wherein the intermediate point within the buffer table defined by the intermediate pointer is established during the initialization of the buffer table.

10. The method of claim 1 wherein step (b) includes the step of incrementing the reference count by one each time the corresponding virtual frame buffer is uniquely accessed by a virtual process during read and write operations to the secondary storage unit.

11. The method of claim 10 wherein incrementing of step (b) is performed only during virtual process deactivation cycles.

12. The method of claim 1 wherein the defined criteria for selecting a replacement candidate relating to each buffer table entry's distance into the buffer table is defined by a first threshold which is based on a percentage of the total number of virtual frame buffers.

13. The method of claim 12 wherein the first threshold is defined by threshold values T1 and T2 corresponding to different depths into the buffer table and wherein the depth of threshold value T1 is less than threshold value T2 and wherein step (d) includes selecting a virtual frame buffer as the replacement candidate when the depth is less than the depths defined by threshold values T1 and T2.

14. The method of claim 13 wherein the total number of virtual frame buffers has an integer value of n and the threshold value has an integer value of 1/n defining that the available virtual frame buffer is located in the bottom 1/nth part of the buffer table.

15. The method of claim 14 wherein the value n corresponds to a number of attach registers allocated to each virtual process.

16. The method of claim 13 wherein the virtual processes are initiated in response to requests made by a number of users and wherein the defined criteria relating to the frequency of use is defined by a second threshold which corresponds to a percentage of the number of users.

17. The method of claim 16 wherein the second threshold is defined by threshold values T3 and T4 wherein threshold value T3 is greater than threshold value T4 and wherein step (d) includes selecting a virtual frame buffer as a replacement candidate when the frequency of use is less than threshold value T4 and the first threshold defined by threshold values T1 and T2 has been met.

18. The method of claim 17 wherein each frame buffer meeting the first threshold and having a frequency of use which is greater than threshold value T3 in lieu of selection is moved to a position within the buffer table defined by the MRU pointer for ensuring that the frame buffer be retained in main memory.

19. The method of claim 1 wherein the reference frequency criteria based on the frequency of use corresponds to a threshold value defining that the associated virtual frame buffer has been accessed a minimum number of times.

20. The method of claim 19 wherein the minimum number of times is no greater than four accesses during a period of time corresponding to the interval of time allocated by the processing unit to the execution of the virtual process.

21. The method of claim 1 wherein the secondary storage unit is a disk device organized as having a plurality of sectors directly mapped into the virtual memory space.

22. The method of claim 1 wherein the BTA mechanism further includes a hash table containing a variable number of entries, the number of entries being a power of 2 and a preestablished multiple of the number of virtual frame buffers for minimizing collisions, the hash table being operatively coupled to the buffer table and the hash table entries containing address information used in obtaining access to frames stored in the virtual buffer frames on the basis of frame identifiers.

23. The method of claim 1 wherein the method further includes the step of resetting the reference counter associated with a particular buffer table entry to zero when the criteria of step (d) has not been met.

24. A method for improving the efficiency of a buffer table and aging (BTA) mechanism in a system having a processing unit, a main memory coupled to the processing unit and a secondary storage unit operatively coupled to the processing unit and to the main memory, the main memory containing virtual memory space shared by virtual processes being executed on the processing unit, the virtual memory space including a specified number of virtual frame buffers for storing a corresponding number of frames transferred from the secondary storage unit by the processing unit in response to requests received from the virtual processes and wherein the virtual space further includes the BTA mechanism associated with the virtual buffers for indicating the frequency of access and relative aging of virtual buffers in virtual memory space during the execution of the virtual processes, the BTA mechanism including a buffer table containing a plurality of entries which are associated with a corresponding number of virtual frame buffers for controlling access thereto and an age table containing entries associated with the buffer table entries which include a most recently used (MRU) pointer for designating the most recently used virtual frame buffer and a least recently used (LRU) pointer for designating the least recently used virtual frame buffer, each age table entry having forward and backward age pointers for linking the buffer table entries together so as to define an age chain for the associated virtual frame buffers, the backward age pointer designating the next recently accessed virtual buffer and the forward age pointer designating the next most recently accessed virtual buffer, a method for increasing the efficiency of the BTA mechanism, comprising the steps of:

(a) associating a reference counter with each buffer table entry for maintaining a reference count of the number of times that an associated virtual frame buffer has been accessed;

(b) incrementing the reference count by one, each time the virtual buffer is uniquely accessed; and, (c) performing a search operation of buffer table entries for determining which virtual frame buffer is to be made available as a replacement candidate using aging and reference frequency criteria based on each buffer table entry's distance into the buffer table as measured from a starting point defined by the age table LRU pointer and the frequency of use of the virtual frame buffer associated therewith as defined by the reference counter associated with the particular buffer table entry; and, (d) only updating the age link table forward and backward link pointers of the age table entries when a replacement operation is being performed on a virtual frame buffer in use by another virtual process which is selected as the replacement candidate according to defined depth and reference frequency criteria for ensuring that only data which is the least recently used is being replaced.

25. A buffer table and aging (BTA) mechanism for use in a system having a processing unit, a main memory coupled to the processing unit and a secondary storage unit operatively coupled to the processing unit and to the main memory, the main memory containing virtual memory space shared by virtual processes being executed on the processing unit, the virtual memory space including a specified number of virtual frame buffers for storing a corresponding number of frames transferred from the secondary storage unit by the processing unit in response to requests received from the virtual processes and wherein the virtual space further includes the BTA mechanism associated with the virtual buffers for indicating the frequency of access and relative aging of virtual buffers in virtual memory space during the execution of the virtual processes, the BTA mechanism including a buffer table containing a plurality of entries which are associated with a corresponding number of virtual frame buffers for controlling access thereto and an age table containing entries associated with the buffer table entries which include a most recently used (MRU) pointer for designating the most recently used virtual frame buffer and a least recently used (LRU) pointer for designating the least recently used virtual frame buffer, each age table entry having forward and backward age pointers for linking the buffer table entries together so as to define an age chain for the associated virtual frame buffers, the backward age pointer designating the next recently accessed virtual buffer and the forward age pointer designating the next most recently accessed virtual buffer, the BTA mechanism further including:

(a) a buffer status word structure allocated to each buffer table entry, the structure including a reference counter for maintaining a reference count of the number of times that an associated virtual frame buffer has been accessed;

(b) means for incrementing the reference count by one, each time the virtual buffer is uniquely accessed; and, (c) means for performing a search operation of buffer table entries for determining which virtual frame buffer is to be made available as a replacement candidate using aging and reference frequency criteria defined as a function of each buffer table entry's distance into the buffer table as measured from a starting point defined by the age table LRU pointer and the frequency of use of the virtual frame buffer associated therewith as defined by the reference counter associated with the particular buffer table entry; and, (d) updating means for only updating the age link table forward and backward link pointers of the age table entries when a replacement operation is being performed on a virtual frame buffer in use by another virtual process which is selected as the replacement candidate according to the defined depth and reference frequency criteria ensuring that only data which is the least recently used is being replaced.

26. The mechanism of claim 25 wherein each buffer table status control word further includes a first indicator bit whose state is used to define the relative position of the associated frame buffer within the buffer table and wherein the age table mechanism further includes first and second global counters for storing first and second counts respectively defining frame buffer positions above and below the intermediate point within the buffer table and wherein the BTA mechanism further includes:

an intermediate pointer for defining the address of the intermediate point within the buffer table for inserting the frame buffer selected as the replacement candidate, the intermediate pointer being defined by the first and second counts stored in the first and second global counters and the state of the indicator bit of the selected frame buffer.

27. The mechanism of claim 26 wherein the BTA mechanism operates to set to a first state, the indicator bit of each replacement candidate frame buffer selected during an insertion operation for insertion at the most recently used position of the buffer table as defined by the MRU pointer and operates to increment by one, the first count of the first global counter and the BTA mechanism operates to reset to a second state, the indicator of each replacement candidate frame buffer selected during an insertion operation for insertion at the intermediate point within the buffer table and operates to increment by one, the second count of the second global counter.

28. The mechanism of claim 27 wherein the BTA mechanism further includes:

means for comparing the first and second counts stored in the first and second global counters upon completion of each insertion operation for determining if the intermediate pointer requires adjustment; and, adjustment means operative when adjustment is required, for adjusting the intermediate pointer by modifying one of the first and second counts stored in the global counters in a predetermined manner and in accordance with count adjustment, setting or resetting the indicator associated with the replacement candidate frame buffer.

29. The mechanism of claim 28 wherein the adjustment means adjusts the intermediate pointer when the comparison means indicates a difference of more than one between the first and second counts by performing one of the following operations:

when adjusting the intermediate pointer toward the most recently used position of the buffer table defined by the first count of the first global counter being less than the second count second global counter, to set the intermediate pointer equal to the backward age link of the frame buffer entry addressed by the intermediate pointer and resets the indicator bit of the new frame buffer entry inserted at the intermediate point of the buffer table; or when adjusting the intermediate pointer is toward the least recently used position of the buffer table defined by the first count of the first global counter being greater than the second count of the second global counter, the adjustment means operates to set the intermediate pointer equal to the forward age link of the frame buffer entry addressed by the intermediate pointer and sets the indicator bit of the new frame buffer entry inserted at the intermediate point of the buffer table.

30. The mechanism of claim 26 wherein during a replacement operation, the mechanism tests the state of the indicator of the frame buffer entry being removed from the age table and decrements the first and second counts of the first and second global counters respectively in accordance with the state of the indicator by performing one of the following operations:

when the indicator bit is in a first state, the mechanism decrements by one, the first count stored in the first global counter; or, when the indicator bit is in a second state, the mechanism decrements by one the second count stored in the second global counter.

* * * * *